H. A. ASCHAUR.
STEERING AXLE.
APPLICATION FILED FEB. 3, 1919.

1,363,211.

Patented Dec. 28, 1920.

Henry A. Aschaur
INVENTOR.

BY Fred. D. Silloway
ATTORNEY.

UNITED STATES PATENT OFFICE.

HENRY A. ASCHAUR, OF SPRINGFIELD, ILLINOIS.

STEERING-AXLE.

1,363,211.  Specification of Letters Patent.  Patented Dec. 28, 1920.

Application filed February 3, 1919. Serial No. 274,824.

*To all whom it may concern:*

Be it known that I, HENRY A. ASCHAUR, a citizen of the United States, residing at Springfield, in the county of Sangamon and State of Illinois, have invented new and useful Improvements in Steering-Axles, of which the following is a specification.

My invention relates to improvements in automobiles and refers more particularly to the steering axle thereof.

The primary object of the invention is to provide an improved steering axle of a type wherein it will be possible to pack the same with hard lubricating oil, and which will allow of the operation of the axle for a long period of time without the necessity of attention by the operator.

A further purpose of the invention is to provide improved arrangement of the bearing elements for my axle, whereby the friction usually attendant in such devices may be greatly reduced, permitting of greater ease in the steering of the automobile.

With the foregoing objects in view, together with other important objects which will hereinafter appear, my invention comprises the new and useful improvements and details to be herein fully described, illustrated in the annexed drawings and pointed out in and by the appended claims.

In the accompanying drawings, wherein the preferred embodiment of my invention is illustrated, like reference characters refer to like or corresponding parts throughout.

In the drawings:—

Figure 1:
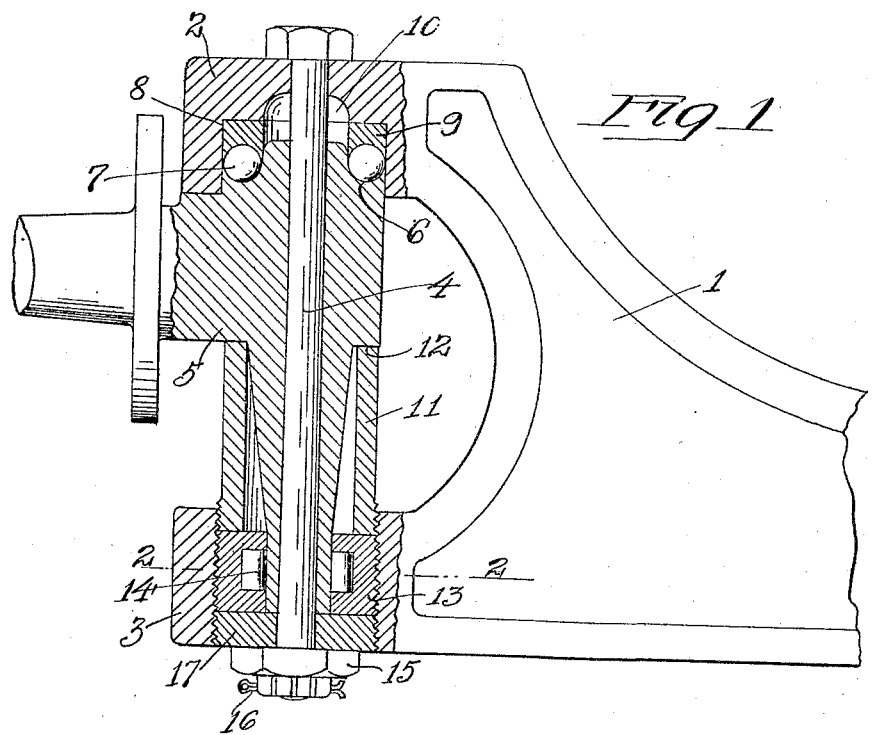
Figure 1 is a vertical sectional view of my steering axle.
Figure 2:
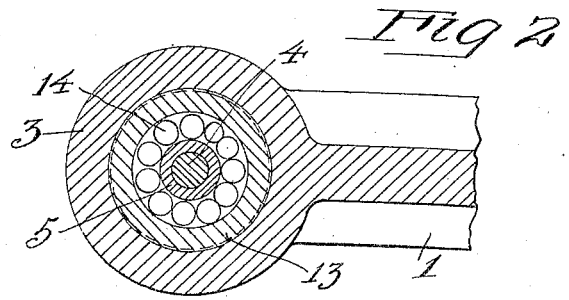
Fig. 2 is a horizontal sectional view of my device, the view being taken on line 2—2 of Fig. 1.

Referring now to the drawings, numeral 1 designates the stationary forward axle of an automobile of the usual type and having the ends thereof forged to form a C-shaped head. Said head is provided with a pair of spaced-apart jaws, numeral 2 designating the upper jaw and numeral 3 the lower jaw. Each of the jaws is perforated vertically with holes having a common axis, and the pivoting bolt 4 of my steering axle is disposed therein.

The steering axle proper is characterized as 5 and is pivoted about bolt 4 between jaws 2 and 3, the upper end of the vertical knuckle thereof being provided with a circular groove adapted to receive a plurality of ball bearings 7. The lower face of jaw 2 is recessed at 8 to receive the upper end of the axle knuckle, and a washer 9 is disposed between the balls 7 and the inner face of the recess 8. Said washer is provided with a circular groove on its lower face to receive the balls and to coact with the groove in the upper end of the axle knuckle to provide a run-way for the balls. Washer 9 is preferably provided with its inner diameter considerably larger than the pivoting bolt 4, thereby allowing a space for the introduction of hard oil about the bolt. Jaw 2 is also further recessed at 10 to provide added space for lubricant.

Lower jaw 3 is perforated with a relatively larger hole than jaw 2, and a cylindrical casing 11 carried therein, the outer wall of said casing being provided with threads adapted to mesh with the similarly threaded inner wall of the perforation in jaw 3. Casing 11 envelops the lower end of the axle knuckle, and the upper edge thereof is adapted to fit snugly against a turned face 12 around the knuckle. The axle knuckle is preferably tapered for that portion of its length within casing 11, and the space between the knuckle and the casing is adapted to receive hard oil lubricant. A roller bearing block 13 is screwed into the threaded perforation in jaw 3 below casing 11, the same being provided with a plurality of rollers 14 adapted to bear against the knuckle. A threaded washer 17 is screwed into the jaw 3 against the bearing block 13 and the lower end of the knuckle, and a locknut 15 is provided on the lower end of bolt 4 against washer 17, a cotter pin 16 being passed through notches on the lower face thereof and through perforations therefor in bolt 4.

From the foregoing description it will be readily seen that my invention provides an improved steering axle wherein it will be possible to pack the same with hard lubricant, and that my improved arrangement of the bearing elements will reduce the friction in such elements.

While I have herein described and shown the preferred embodiment of my invention, I do not desire to limit myself to the exact details shown, as it is obvious that those details may be varied in many ways without departing from the spirit of the appended claims.

Having thus described my invention, what I claim is:—

1. A steering axle comprising in combination, an upper jaw and a lower jaw, a stub shaft having a vertically perforated knuckle disposed between said jaws, ball bearings between the upper end of said knuckle and the upper jaw, said upper jaw recessed above said ball bearings to receive lubricant for said bearings, a casing carried by the lower jaw about the lower portion of the knuckle providing space for lubricant about the knuckle, roller bearings disposed about said knuckle in the lower jaw, and a pivoting bolt disposed vertically in said jaws and passing through the perforation in the knuckle.

2. A steering axle comprising in combination, an upper jaw and a lower jaw, a stub shaft having a vertically perforated knuckle disposed between said jaws, ball bearings between the upper end of said knuckle and the upper jaw, said upper jaw recessed above said ball bearings to receive lubricant for said bearings, a casing carried by the lower jaw about the lower portion of the knuckle providing space for lubricant about the knuckle, a roller bearing block screwed into the lower jaw about the knuckle, and a pivoting bolt disposed vertically through the perforation in the knuckle.

3. A steering axle comprising in combination, an upper jaw and a lower jaw, a stub shaft having a vertically perforated knuckle disposed between said jaws, ball bearings between the upper end of the knuckle and the upper jaw, said upper jaw recessed above said ball bearings to receive lubricant for said bearings, a casing carried by the lower jaw about the lower portion of the knuckle providing space for lubricant about the knuckle, a roller bearing block screwed into the lower jaw about the knuckle, a washer screwed into the lower jaw against the bearing block and the lower face of the knuckle, and a pivoting bolt disposed vertically in said jaws and passing through the perforation in said knuckle and through said washer.

HENRY A. ASCHAUR.

Witnesses:
Le Roy L. Bacchus,
Gilbert McCoy.